US012744268B2

(12) United States Patent
Otsuka et al.

(10) Patent No.: US 12,744,268 B2
(45) Date of Patent: Sep. 22, 2026

(54) FLAT-SHAPED ALL-SOLID BATTERY AND METHOD FOR MANUFACTURING SAME

(71) Applicant: Maxell, Ltd., Otokuni-gun (JP)

(72) Inventors: Takumi Otsuka, Otokuni-gun (JP); Hidetoshi Morikami, Otokuni-gun (JP); Akihiro Fujimoto, Otokuni-gun (JP)

(73) Assignee: Maxell, Ltd., Kyoto (JP)

( * ) Notice: Subject to any disclaimer, the term of this patent is extended or adjusted under 35 U.S.C. 154(b) by 810 days.

(21) Appl. No.: 17/271,364

(22) PCT Filed: Aug. 7, 2019

(86) PCT No.: PCT/JP2019/031206
§ 371 (c)(1),
(2) Date: Feb. 25, 2021

(87) PCT Pub. No.: WO2020/066323
PCT Pub. Date: Apr. 2, 2020

(65) Prior Publication Data

US 2021/0328292 A1 Oct. 21, 2021

(30) Foreign Application Priority Data

Sep. 26, 2018 (JP) ................................ 2018-179764

(51) Int. Cl.
*H01M 50/171* (2021.01)
*H01M 4/04* (2006.01)
(Continued)

(52) U.S. Cl.
CPC ....... *H01M 50/171* (2021.01); *H01M 4/0433* (2013.01); *H01M 4/364* (2013.01);
(Continued)

(58) Field of Classification Search
CPC .. H01M 50/171; H01M 50/167; H01M 4/364; H01M 10/0562; H01M 10/0585
See application file for complete search history.

(56) References Cited

U.S. PATENT DOCUMENTS 3,617,387 A * 11/1971 Grulke .................... H01M 6/06 429/162
3,944,435 A * 3/1976 Kordesch .......... H01M 10/0436 429/219
(Continued)

FOREIGN PATENT DOCUMENTS

JP 58-158866 A 9/1983
JP 1-134876 A 5/1989
(Continued)

OTHER PUBLICATIONS

Machine Translation of JP-2004269319-A (Oct. 30, 2024) (Year: 2024).*
(Continued)

*Primary Examiner* — Matthew J Merkling
(74) *Attorney, Agent, or Firm* — WHDA, LLP

(57) ABSTRACT

A flat-shaped all-solid battery described in this application includes a battery container constituted by an outer can and a sealing can and a stack which a positive electrode, a solid electrolyte layer, and a negative electrode are stacked W form. The stack is housed in the battery container. A conducive porous member constituted by a molded body of graphite and having flexibility is disposed between the stack and an inner bottom surface of the outer can or an inner bottom surface of the sealing can. Moreover, in the above flat-shaped all-solid battery, the conductive porous member can be disposed between the stack and the inner bottom surface of the sealing can, and between the stack and the inner bottom surface of the outer can.

10 Claims, 4 Drawing Sheets

(51) Int. Cl.

| | |
|---|---|
| ***H01M 4/36*** | (2006.01) |
| ***H01M 10/0562*** | (2010.01) |
| ***H01M 10/0585*** | (2010.01) |
| ***H01M 50/109*** | (2021.01) |
| ***H01M 50/153*** | (2021.01) |
| ***H01M 50/167*** | (2021.01) |
| ***H01M 50/186*** | (2021.01) |

(52) U.S. Cl.

CPC ... *H01M 10/0562* (2013.01); *H01M 10/0585* (2013.01); *H01M 50/109* (2021.01); *H01M 50/153* (2021.01); *H01M 50/167* (2021.01); *H01M 50/186* (2021.01)

(56) References Cited

U.S. PATENT DOCUMENTS 5,795,680 A * 8/1998 Ikeda .................. H01M 50/109 429/235
6,803,150 B1 * 10/2004 Iriyama ............... H01M 4/1393 252/502
8,460,823 B1 * 6/2013 Delnick .................. H01M 4/13 429/212
8,501,307 B2 * 8/2013 Zhamu ..................... H01B 1/04 252/502
9,984,794 B1 * 5/2018 Imae ........................ H01B 7/29
2002/0012625 A1 1/2002 Watanabe et al.
2005/0019663 A1 1/2005 Nanno et al.
2008/0254355 A1 * 10/2008 Muraoka ............. H01M 10/058 429/129
2008/0289676 A1 * 11/2008 Guidotti .............. H01M 4/0419 136/200
2009/0057940 A1 * 3/2009 Zhamu .................. H01M 4/663 264/49
2010/0119881 A1 * 5/2010 Patel ................... H01M 50/581 429/7
2011/0159381 A1 * 6/2011 Doe ........................ H01M 4/13 429/219
2012/0009474 A1 * 1/2012 Yanagihara ........... H01M 4/362 427/126.6
2015/0333368 A1 * 11/2015 Kato ................. H01M 10/0562 429/323
2017/0179518 A1 6/2017 Tour et al.
2017/0207500 A1 * 7/2017 Amine .................. H01M 4/485

FOREIGN PATENT DOCUMENTS

| | | | | |
|---|---|---|---|---|
| JP | H06-5277 | A | | 1/1994 |
| JP | 11-144761 | A | | 5/1999 |
| JP | 2002-260650 | A | | 9/2002 |
| JP | 2004269319 | A | * | 9/2004 |
| JP | 2005-56827 | A | | 3/2005 |
| JP | 2006-079958 | A | | 3/2006 |
| JP | 2015-56326 | A | | 3/2015 |
| JP | 2015-111532 | A | | 6/2015 |
| JP | 2017-517141 | A | | 6/2017 |
| JP | 2018-63850 | A | | 4/2018 |
| WO | 2012/141231 | A1 | | 10/2012 |
| WO | 2017/123546 | A1 | | 7/2017 |
| WO | 2021/033601 | A1 | | 2/2021 |

OTHER PUBLICATIONS

Yazici et al. "Flexible graphite as battery anode and current collector", Journal of Power Sources 141, (2005), 171-176 (Year: 2005).*
Ziv et al. Investigation of Graphite Foil as Current Collector for Positive Electrodes of Li-Ion Batteries, Journal of the Electrochemical Society, 160 (4), A581-A587 (2013) (Year: 2013).*
Office Action dated Dec. 13, 2022, issued in the counterpart EP application No. 19866828.7. (6 pages).
Office Action dated Jan. 5, 2023, issued in the counterpart JP application No. 2021-159447, with English Translation. (5 pages).
Supplementary European Search Report dated Nov. 5, 2021, issued in counterpart EP Application No. 19866828.7. (4 pages).
Office Action dated Dec. 1, 2021, issued in counterpart EP Application No. 19866828.7. (6 pages).
International Search Report dated Oct. 21, 2019, issued in counterpart International Application No. PCT/JP2019/031206 (2 pages).
Junichi, Aizawa, Q & A: How is expanded graphite made, what characteristics does it have, and where is it used?, Tanso 1999, No. 189 (1999), 207-208, with partial English translation. (4 pages).

* cited by examiner

FLAT-SHAPED ALL-SOLID BATTERY AND METHOD FOR MANUFACTURING SAME

TECHNICAL FIELD

The present invention relates to a flat-shaped all-solid battery that is excellent in reliability and productivity, and a method for manufacturing the battery.

BACKGROUND ART

In association with the development of portable electronic devices such as mobile phones and notebook personal computers and the commercialization of electric vehicles in recent years, there have been needs for small, lightweight, high capacity, and high energy density secondary batteries.

In nonaqueous secondary batteries that can satisfy such needs at present, particularly in lithium ion secondary batteries, a lithium-containing composite oxide such as lithium cobalt oxide ($LiCoO_2$) or lithium nickel oxide ($LiNiO_2$) is used as a positive electrode active material, graphite is used as a negative electrode active material, and an organic electrolyte containing an organic solvent and a lithium salt is used as a non-aqueous electrolyte.

Moreover, in association with the further development of devices to which the nonaqueous secondary batteries are applied, there have been demands for a longer life, a higher capacity, and a higher energy density of the nonaqueous secondary batteries, and much demands for the reliability of the nonaqueous secondary batteries with a longer life, a higher capacity, and a higher energy density.

However, since the organic electrolyte used in each lithium ion secondary battery contains an organic solvent that is a flammable substance, the organic electrolyte could abnormally generate heat if an abnormality such as a short circuit occurs in the battery. Moreover, in association with an increase in an energy density of the nonaqueous secondary batteries and a trend toward increase in an amount of the organic solvent in the organic electrolyte in recent years, there have been needs for higher reliability of the nonaqueous secondary batteries.

Under the circumstances as above, an all-solid secondary battery without an organic solvent has been considered (e.g., Patent Documents 1 and 2). The all-solid secondary battery includes a molded body of a solid electrolyte without an organic solvent, instead of a conventional organic solvent-based electrolyte, has no likelihood of abnormal heat generation of the solid electrolyte, and exhibits high reliability.

Meanwhile, a flat-shaped battery called a coin-shaped battery or a button-shaped battery is known among secondary batteries. In such a flat-shaped battery, an outer casing is used which is formed by interposing a gasket between an outer can and a sealing can, and inwardly crimping an opening edge of the outer can. However, the present inventors' studies have revealed that when such an outer casing is used, a crack easily occurs on an electrode, particularly on an electrode proximate to the sealing can (a negative electrode) in a battery including an electrode (a pellet-shaped electrode) constituted by a molded body of an electrode material mixture containing an active material, such as an all-solid battery.

If a crack occurs on the electrode, the reliability of the battery is compromised, for example, the capacity deteriorates. Moreover, if a ratio of such batteries with low reliability increases in a mass production of batteries, the productivity of the batteries decreases. Therefore, when an all-solid battery is constituted using such a flat-shaped outer casing, it is required to eliminate or reduce a crack on the electrodes during the production.

To cope with this, it has been proposed that an elastic body whose surface is covered with a conductor be disposed between an outer can (a positive electrode can) and a positive electrode, and between a sealing can (a negative electrode can) and a negative electrode to relieve a stress between the positive electrode can and the negative electrode can in order to prevent a crack on electrodes (Patent Document 3).

Moreover, it has been proposed that in a surface-mounting type solid battery that has not been subjected to a crimping process, a current collector having elasticity and containing a conductive substance, such as a carbon sheet or an anisotropic conductive rubber sheet, be disposed between a housing and at least one of a positive electrode and a negative electrode to eliminate or reduce physical damage (e.g., a crack) on a battery body including a positive electrode layer, a solid electrolyte layer, and a negative electrode layer (Patent Document 4).

PRIOR ART DOCUMENTS

Patent Documents

[Patent Document 1] JP 2005-056827A
[Patent Document 2] JP 2015-056326A
[Patent Document 3] JP H11-144761 A
[Patent Document 4] WO 20121141231 A1

DISCLOSURE OF INVENTION

Problem to be Solved by the Invention

However, even when the elastic materials are used, desired characteristics are not always obtained due to, e.g., conditions during assembling batteries. Moreover, it has been required to further consider, for example, materials for the batteries and methods for manufacturing the batteries.

This application has been conceived in view of the above circumstances, and provides a flat-shaped all-solid battery that is excellent in reliability and productivity.

Means for Solving Problem

A flat-shaped all-solid battery described in this application includes a battery container constituted by an outer can and a sealing can and a stack which a positive electrode, a solid electrolyte layer, and a negative electrode are stacked to form. The stack is housed in the battery container. A conductive porous member constituted by a molded body of graphite and having flexibility is disposed between the stack and an inner bottom surface of the outer can or an inner bottom surface of the sealing can.

Moreover, a method for manufacturing a flat-shaped all-solid battery described in this application is a method for manufacturing a flat-shaped all-solid battery including a battery container constituted by an outer can and a sealing can and a stack which a positive electrode, a solid electrolyte layer, and a negative electrode are stacked to form. The method includes constituting an assembly by placing the stack and a conductive porous member on an inner bottom surface of the sealing can on which an annular gasket is installed; and sealing the outer can by covering the assembly with the outer can and crimping the outer can. The conductive porous member is disposed between the stack and an inner bottom surface of the outer can or the inner bottom surface of the sealing can. The conductive porous member is a conductive porous sheet constituted by fibers of a carbon material or a conductive porous sheet constituted by a molded body of graphite and having flexibility. The gasket includes a bottom surface portion sandwiched between an opening edge of the sealing can and the inner bottom surface of the outer can. The assembly is constituted to satisfy $-0.25 \le a-t \le 0.18$, where t (mm) represents the height from the inner bottom surface of the sealing can to an end of the bottom surface portion of the gasket that is proximate to the outer can, and a (mm) represents the total of thicknesses of the stack and the conductive porous member.

Effects of the Invention

This application can provide a flat-shaped all-solid battery that is excellent in reliability and productivity.

DESCRIPTION OF THE INVENTION

A flat-shaped all-solid battery according to an embodiment of this application is described. The flat-shaped all-solid battery according to this embodiment includes a battery container constituted by an outer can and a sealing can, and a stack which a positive electrode, a solid electrolyte layer, and a negative electrode are stacked to form. The stack is housed in the battery container. A conductive porous member (a conductive porous sheet constituted by a molded body of graphite and having flexibility) is disposed between the stack and an inner bottom surface of the outer can or an inner bottom surface of the sealing can.

When a pressing force is applied in the thickness direction, the conductive porous member can absorb the pressing force to relax a force that exerts on an electrode by being compressed.

Moreover, the conductive porous member can favorably maintain the conduction between the stack and the battery container by repeating compression and restoration in response to the expansion and the contraction of the stack during charging and discharging of the battery.

In the battery industry, a flat-shaped battery having a diameter greater than a height thereof is referred to as a "coin-shaped battery" or "button-shaped battery", but there is no clear difference between the coin-shaped battery and the button-shaped battery. The category of the flat-shaped all-solid battery according to this embodiment includes both of the coin-shaped batteries and the button-shaped batteries.

Hereinafter, this embodiment is described with reference to the drawings while comparing the flat-shaped all-solid battery according to this embodiment with a conventional flat-shaped all-solid battery.

Figure 1:
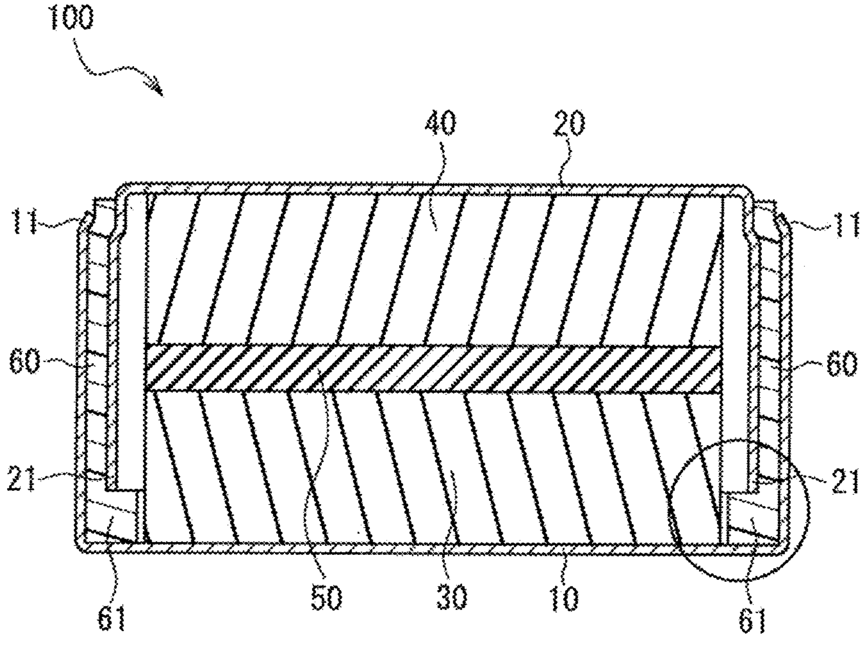
FIG. 1 is a schematic cross-sectional view illustrating an example of a conventional flat-shaped all-solid battery.

FIG. 1 is a schematic cross-sectional view illustrating an example of the conventional flat-shaped all-solid battery. A flat-shaped all-solid battery 100 illustrated in FIG. 1 is constituted by a stack which a positive electrode 30, a solid electrolyte layer 50, and a negative electrode 40 are stacked to form, and a battery container constituted by an outer can 10, a sealing can 20, and a gasket 60. The stack is housed in the battery container. The sealing can 20 is fitted into an opening of the outer can 10 via the gasket 60. An opening edge 11 of the outer can 10 is tightened inwardly by crimping, which brings the gasket 60 into contact with the sealing can 20. Thus, the opening of the outer can 10 is sealed to form a closed structure in the battery. Moreover, a bottom surface portion 61 of the gasket 60 is compressed with an opening edge 21 of the sealing can 20 by crimping the opening edge 11 of the outer can 10, thereby providing a strong closed structure.

In the case of the flat-shaped battery with the structure as illustrated in FIG. 1, a great stress is applied, by inwardly crimping the opening edge of the outer can, to an edge portion of an electrode facing the battery container (the outer can or the sealing can) that faces toward the battery container, e.g., a circled location in FIG. 1. Therefore, when the solid electrolyte layer that is hard to deform is interposed between the positive electrode and the negative electrode instead of a separator that is easily compressed, a crack could easily occur on the electrode due to the stress. In particular, when the electrode is hard to deform like a molded body (e.g., a pellet) of an electrode material mixture containing an active material, the problem of a crack on the electrode could more easily occur.

Figure 2:
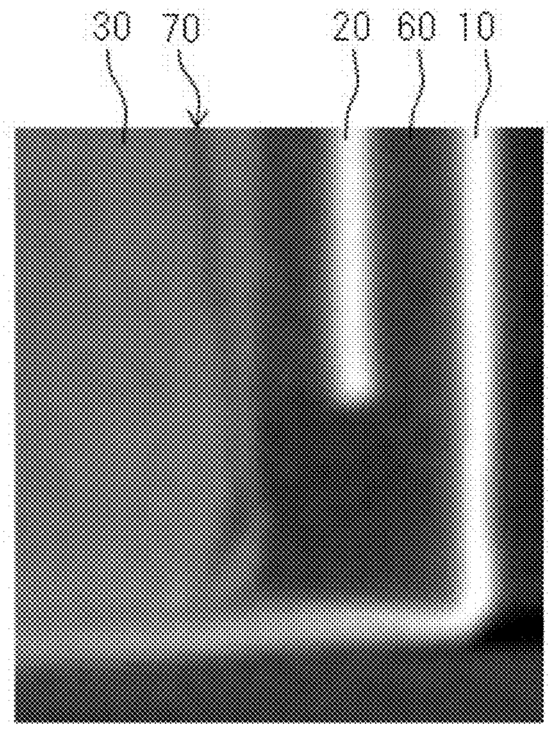
FIG. 2 is a cross sectional image at an edge portion of an electrode proximate to an outer can of the conventional flat-shaped all-solid battery, which has been photographed using an X-ray CT scanner in a nondestructive manner.

FIG. 2 illustrates a cross sectional image at the circled location in FIG. 1 in the flat-shaped battery with the structure illustrated in FIG. 1, which has been photographed using an X-ray CT scanner in a nondestructive manner. It is confirmed that a crack 70 appears on the electrode (the positive electrode 30 in FIG. 1).

Moreover, in the crimping, a grater stress is easily applied to an edge portion of an electrode proximate to the sealing can (the negative electrode 40 in FIG. 1) that is near the sealing can, depending on, e.g., the shape of the battery container. Therefore, when the solid electrolyte layer that is hard to deform is interposed between the positive electrode and the negative electrode instead of a separator that is easily compressed, a crack could easily occur particularly on the electrode proximate to the sealing can due to the stress.

To cope with this, in the flat-shaped all-solid battery according to this embodiment, the conductive porous member can relax a force that exerts on an electrode by being compressed and that can function as a current collector is disposed between the stack (hereinafter, also called an "electrode stack") constituted by the positive electrode, the solid electrolyte layer, and the negative electrode and the inner bottom surface of the outer can or the inner bottom surface of the sealing can.

Figure 3:
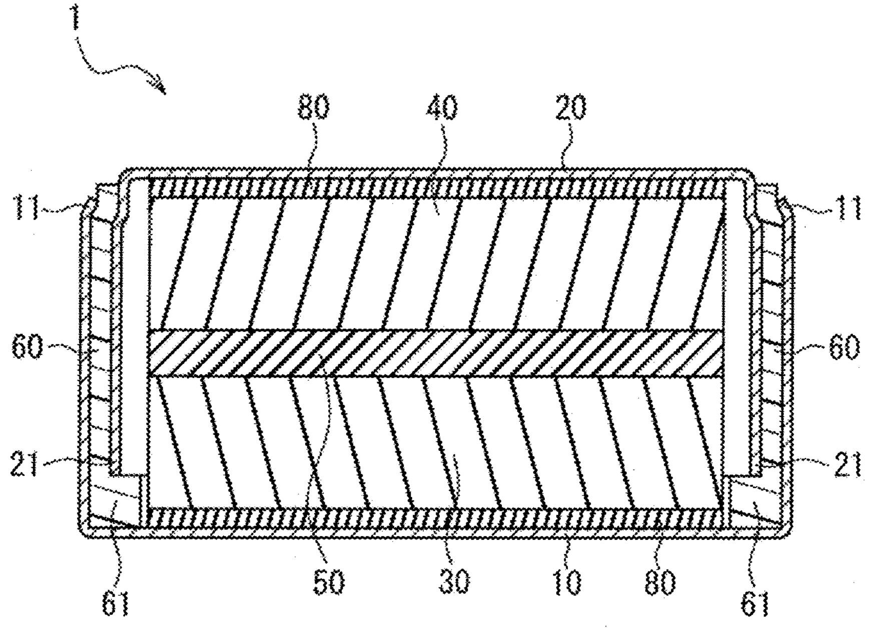
FIG. 3 is a schematic cross-sectional view illustrating an example of a flat-shaped all-solid battery according to this embodiment.

FIG. 3 is a schematic cross-sectional view of the flat-shaped all-solid battery according to this embodiment. In FIG. 3, the members corresponding those illustrated in FIG. 1 are denoted by the same reference numerals, and the detailed explanation is omitted. The same applies to FIGS. 4 and 5 described later.

In a flat-shaped all-solid battery 1 illustrated in FIG. 3, individual conductive porous members 80, 80 (conductive porous sheets each constituted by a molded body of graphite and having flexibility) are disposed between the stack constituted by the positive electrode 30, the solid electrolyte layer 50, and the negative electrode 40 and the inner bottom surface of the outer can 10, and between the stack and the inner bottom surface of the sealing can 20.

In the flat-shaped all-solid battery according to this embodiment, a stress applied to the electrode proximate to the sealing can when the outer can is crimped is relieved mainly by the conductive porous member disposed proximately to the inner bottom surface of the sealing can. Thus, it is possible to eliminate or reduce a crack on the electrode proximate to the sealing can. Thus, it is possible to provide a highly reliable flat-shaped all-solid battery and enhance the productivity of the flat-shaped all-solid battery using the conductive porous member.

Moreover, when the opening edge of the outer can is crimped inwardly, a crack could occur on the electrode proximate to the outer can (the positive electrode 30 in FIG. 1), and particularly, e.g., at the circled location in FIG. 1 in the flat-shaped all-solid battery, depending on, e.g., the shape of the battery container. Further, when the electrode proximate to the outer can is hard to deform like a molded body (e.g., a pellet) of an electrode material mixture containing an active material, the problem of a crack on the electrode proximate to the outer can more easily occurs.

However, in the flat-shaped all-solid battery according to this embodiment, a stress applied to the electrode proximate to the outer can when the outer can is crimped is relieved mainly by the conductive member disposed proximately to the inner bottom surface of the outer can. Thus, it is possible to eliminate or reduce a crack on the electrode proximate to the outer can.

Thus, in this embodiment, it is preferable that the conductive porous member is also disposed between the stack constituted by the positive electrode, the solid electrolyte layer, and the negative electrode and the inner bottom surface of the outer can as illustrated in FIG. 3. Thus, it is also possible to eliminate or reduce a crack on the electrode proximate to the outer can to enhance the reliability and the productivity of the battery.

FIG. 3 illustrates an example of the flat-shaped all-solid battery according to this embodiment, and the flat-shaped all-solid battery according to this embodiment is not limited to the battery having the configuration illustrated in FIG. 3.

For example, the conductive porous member can be disposed only between the electrode stack and the inner bottom surface of the outer can. However, generally, it can be considered that a crack could occur more easily on the electrode proximate to the sealing can. Thus, it is preferable that the conductive porous member is disposed at least between the electrode stack and the inner bottom surface of the sealing can.

Moreover, when a flat-shaped all-solid battery is repeatedly charged and discharged, an electrode stack repeats expansion and contraction due to a volume change of a positive electrode active material and/or a negative electrode active material. This causes a problem that the conduction between the electrode stack and an outer can, and between the electrode stack and a sealing can cannot favorably maintained, or a problem that a crack could easily occur on an electrode proximate to the outer can or an electrode proximate to the sealing can due to a pressing force from a battery container in the expansion of the electrode stack.

On the other hand, in the flat-shaped all-solid battery according to this embodiment, the conductive porous member disposed on each side of the electrode stack is compressed and restores its shape in response to the expansion and the contraction of the electrode stack, and thus can relax a force that exerts on an electrode and can favorably maintain the conduction between the electrode stack and the outer can, and between the electrode and the sealing can. This can enhance the reliability of the battery.

Even when disposed only on one side of the electrode stack, the conductive porous member exhibits effects of preventing the above problems. However, the conductive porous member can more reliably exhibit the above effects when disposed on both sides of the electrode stack.

In the flat-shaped solid battery 1 illustrated in FIG. 3, the electrode stack is disposed such that the positive electrode 30 is proximate to the outer can 10 and the negative electrode 40 is proximate to the sealing can 20. However, the flat-shaped all-solid battery according to this embodiment is not limited to an aspect illustrated in FIG. 3. For example, the electrode stack can be disposed such that the positive electrode is proximate to the sealing can and the negative electrode is proximate to the outer can.

Moreover, in the flat-shaped all-solid battery according to this embodiment, it is possible to use an electrode stack including a plurality of layers of a positive electrode and/or a negative electrode and constituted by interposing a solid electrolyte layer between the positive electrode(s) and the negative electrode(s). In this case, it is possible that an outermost electrode proximate to the sealing can and an outermost electrode proximate to the outer can of the electrode stack have different polarities from each other as illustrated in FIG. 3, or that the electrode proximate to the sealing can and the electrode proximate to the outer can have the same polarity. Here, in the case of the battery in which the electrode stack having the plurality of layers of a positive electrode and/or a negative electrode, the electrode proximate to the sealing can means the electrode that is most proximate to the sealing can, and the electrode proximate to the outer can means the electrode that is most proximate to the outer can.

Next, constituent members and a process of assembling of the flat-shaped all-solid battery according to this embodiment is described.

<Conductive Porous Member>

The conductive porous member used for the flat-shaped all-solid battery according to this embodiment can be any conductive porous member that can properly absorb a pressing farce by being compressed when the pressing force is applied in the thickness direction and that can sufficiently restore its shape when the pressing force is released. However, a conductive parous sheet constituted by fibers of a carbon material, or a conductive parous sheet constituted by a molded body of graphite and having flexibility is preferred. The reason is as follows. Because these sheets are excellent in the ability of absorbing a pressing force and conductive properties, and can be compressed and restore their shapes in response to the expansion and the contraction of the electrode stack, they can maintain good contact state between the electrode stack and the battery container.

Moreover, also when a solid electrolyte that easily reacts with other components in the battery like a sulfide-based solid electrolyte, is used, the above conductive parous sheets can stably maintain their functions.

A conductive foamed base material constituted by metal such as copper or aluminum as the conductive porous member can properly absorb a pressing force by being compressed when the pressing force is applied in the thickness direction. However, the conductive foamed base material cannot restore its shape when the pressing forme is released, and thus have difficulty in appropriately maintaining the conduction with the battery container when the electrode stack expands and contracts.

The examples of the conductive porous sheet constituted by the fibers of a carbon material can include a carbon felt, and a woven fabric or a nonwoven fabric of carbon nanotube fibers.

In the conductive porous sheet constituted by the fibers of a carbon material, the fibers constituting the sheet preferably have a fiber diameter of 1 mm to 1 μm.

Moreover, the conductive porous sheet constituted by the fibers of a carbon material has a thickness of preferably 0.1 to 1 mm, and more preferably 0.5 mm or less.

Further, the conductive porous sheet constituted by the fibers of a carbon material preferably has a basis weight of 5 to 200 $g/m^2$.

Meanwhile, in view of compressibility and restorability, the conductive porous member is more preferably of a conductive porous sheet constituted by the molded body of graphite and having flexibility.

The conductive porous sheet is preferably in the form of a sheet obtained by molding graphite without using a binder, and more preferably a conductive porous sheet in which expandable graphite is used because of excellent flexibility, compressibility, and restorability.

As the sheet constituted by the molded body of graphite, a flexible graphite sheet "PERMA-FOIL (trade name)" manufactured by Toyo Tanso Co., Ltd., or a flexible graphite sheet "GRAFOIL (trade name)" manufactured by NeoGraf Solutions, LLC can be preferably used.

In order to achieve excellent compressibility or restorability, the sheet constituted by the molded body of graphite has a thickness of preferably 0.03 mm or more, more preferably 0.05 mm or more, and further preferably 0.07 mm or more. Meanwhile, in order to prevent the increase in the electric resistance, the sheet has a thickness of preferably 0.5 mm or less, more preferably 0.3 mm or less, and further preferably 0.2 mm or less.

In order to achieve excellent conductive properties, the sheet constituted by the molded body of graphite has an apparent density of preferably 0.5 $g/cm^3$ or more, and more preferably 0.7 $g/cm^3$ or more. Meanwhile, in order to achieve excellent flexibility, the sheet has an apparent density of preferably 1.7 $g/cm^3$ or less, and more preferably 1.4 $g/cm^3$ or less.

In order to relax a force that exerts on an electrode and favorably maintain the conduction between the electrode stack and the battery container, the conductive parous sheet constituted by the fibers of a carbon material and the conductive porous sheet constituted by the molded body of graphite and having flexibility each have an area of preferably 70% or more, more preferably 80% or more, and further preferably 90% or more of the area of an opposing electrode. Meanwhile, when the area of a portion of each of the conductive porous sheets extending beyond the electrode is large, an unused space increases around the electrode stack, which results in the decrease in the capacity of the battery. Therefore, the conductive porous sheet has an area of preferably 130% or less, more preferably 120% or less, and further preferably 110% or less of the area of the opposing electrode.

The conductive porous sheet satisfying such physical property values can sufficiently relieve a stress applied to the electrode proximate to the sealing can or the electrode proximate to the outer can, with the crimping during the formation of the battery container, and thus can favorably eliminate or reduce a crack on the electrodes.

Moreover, even when the battery is repeatedly charged and discharged, the conductive porous sheet repeats compression and restoration in accordance with a volume change of the electrode stack, and thus can favorably maintain the conduction between the electrode stack and the outer can, and between the electrode stack and the sealing can.

<Positive Electrode>

The positive electrode of the flat-shaped all-solid battery according to this embodiment can be, e.g., that obtained by molding a positive electrode material mixture containing a positive electrode active material (a positive electrode material mixture molded body) or that having a structure in which a layer of the positive electrode material mixture (a positive electrode material mixture layer) containing the positive electrode active material is provided on one surface or both surfaces of a current collector.

The positive electrode active material can be an active material that is capable of absorbing and desorbing lithium ions and that is similar to an active material for use in conventionally known lithium ion secondary batteries. Specifically, the examples of the positive electrode active material can include spinel type lithium manganese composite oxides expressed by $LiM^1_xMn_{2-x}O_4$ (where $M^1$ is at least one element selected from the group consisting of Li, B, Mg, Ca, Sr. Ba, Ti, V, Cr, Fe, Co, Ni, Cu, Al, Sn, Sb, In, Nb, Mo, W, Y, Ru, and Rh, and $0.01 \leq x \leq 0.5$); layered compounds expressed by $Li_aM_{(1-b-a)}Ni_bM^2_cO_{2-d}F_f$ (where $M^2$ is at least one element selected from the group consisting of Co, Mg, Al, B, Ti, V, Cr, Fe, Cu, Zn, Zr, Mo, Sn, Ca, Sr, and W, $0.8 \leq a \leq 1.2$, $0<b<0.5$, $0 \leq c \leq 0.5$, $d+f<1$, $-0.1 \leq d \leq 0.2$, and $0 \leq f \leq 0.1$); lithium cobalt composite oxides expressed by $LiCo_{1-g}M^3_gO_2$ (where $M^3$ is at least one element selected from the group consisting of Al, Mg, Ti, Zr, Fe, Ni, Cu, Zn, Ga, Ge, Nb, Mo, Sn, Sb, and Ba, and $0 \leq g \leq 0.5$); lithium nickel composite oxides expressed by $LiNi_{1-h}M^4_hO_2$ (where $M^4$ is at least one element selected from the group consisting of Al, Mg, Ti, Zr, Fe, Ce, Cu, Zn, Ga, Ge, Nb, Mo, Sn, Sb, and Ba, and $0 \leq h \leq 0.5$); olivine type composite oxides expressed by $LiM^5_{1-m}N_mPO_4$ (where $M^2$ is at least one element selected from the group consisting of Fe, Mn, and Co, N is at least one element selected from the group consisting of Al, Mg Ti, Zr, Ni, Cu, Zn, Ga, Ge, Nb, Mo, Sn, Sb, and Ba, and $0 \leq m \leq 0.5$); and a lithium titanium composite oxide expressed by $Li_4Ti_5O_{12}$. These can be used alone or in a combination of two or more.

In the case of the positive electrode constituted by the positive electrode material mixture molded body and the positive electrode including the positive electrode material mixture layer, the positive electrode material mixture (the positive electrode material mixture layer) can contain the positive electrode active material in addition to a conductivity enhancing agent and/or a binder, a solid electrolyte instead of the conductivity enhancing agent and/or the binder, or the solid electrolyte and the conductivity enhancing agent and/or the binder.

The solid electrolyte used for the positive electrode can be the same as any of solid electrolytes (exemplified later) that are interposed between the positive electrode and the negative electrode.

The binder of the positive electrode can be, e.g., a fluorocarbon resin such as polyvinylidene fluoride (PVDF). The conductivity enhancing agent of the positive electrode can be, e.g., a carbon material such as carbon black.

The current collector used for the positive electrode can be a base material constituted by a metal material such as aluminum, nickel, stainless steel, or titanium, or a sheet constituted by a foil, a punching metal, a mesh, an expanded metal, a foamed base material, or a fibrous material made of the metal material.

Moreover, voids in the sheet constituted by the foamed base material or the fibrous material can be filled with the positive electrode material mixture to constitute the positive electrode.

The composition of the positive electrode material mixture of the positive electrode can include, e.g., preferably 50 to 90 mass % of the positive electrode active material, preferably 0.1 to 10 mass % of the conductivity enhancing agent, preferably 0.1 to 10 mass % of the binder, and preferably 10 to 50 mass % of the solid electrolyte when the solid electrolyte is used.

In the case of the positive electrode constituted by the positive electrode material mixture molded body, the positive electrode preferably has a thickness of 0.15 to 4 mm. On the other hand, in the case of the positive electrode having the structure in which the positive electrode material mixture layer is provided on a surface of the current collector, the positive electrode material mixture layer preferably has a thickness (the thickness per surface of the current collector when the positive electrode material mixture layer is provided on the both surfaces of the current collector) of 30 to 300 μm.

<Negative Electrode>

The negative electrode of the flat-shaped all-solid battery according to this embodiment is not particularly limited, and can be any negative electrode for use in conventionally known lithium ion secondary batteries. i.e., any negative electrode containing an active material capable of absorbing and desorbing lithium ions. A negative electrode active material is, e.g., a mixture that contains one or two or more of carbon-based materials capable of absorbing and desorbing lithium, such as graphite, pyrolytic carbon, coke, glassy carbon, baked products of organic polymer compounds, mesocarbon microbeads (MCMB), and carbon fibers. The negative electrode active material can be a simple substance, compound or alloy including an element such as Si, Sn, Ge, Bi, Sb, or In; a compound capable of charging and discharging at a low voltage close to that of lithium metal such as a lithium-containing nitride or lithium-containing oxide; or a lithium metal or lithium/aluminum alloy.

The negative electrode can be, e.g., that obtained by molding a negative electrode material mixture obtained by adding a conductivity enhancing agent (e.g., a carbon material such as carbon black or any of the solid electrolytes that can constitute the solid electrolyte layer, which will be described later) and/or a binder such as PVDF to the negative electrode active material as appropriate (a negative electrode material mixture molded body); that having a structure in which a layer of the negative electrode material mixture containing the negative electrode active material (a negative electrode material mixture layer) is provided on one surface or both surfaces of a current collector; a foil made of any of the alloys and lithium metals listed above alone; or that obtained by stacking the foil as a negative electrode material layer on a current collector.

The current collector used for the negative electrode can be a base material constituted by a metal material such as copper, nickel, stainless steel, or titanium, or a sheet constituted by a foil, a punching metal, a mesh, an expanded metal, a foamed base material, or a fibrous material made of the metal material.

Voids in the sheet constituted by the foamed base material or the fibrous material can be filled with the negative electrode material mixture to constitute the negative electrode.

The composition of the negative electrode material mixture of the negative electrode can include, e.g., preferably 40 to 80 mass % of the negative electrode active material, preferably 0.1 to 10 mass % of the binder, preferably 0.1 to 10 mass % of the conductivity enhancing agent when the conductivity enhancing agent is used, and preferably 10 to 60 mass % of the solid electrolyte when the solid electrolyte is used.

In the case of the negative electrode constituted by the negative electrode material mixture molded body, the negative electrode preferably has a thickness of 0.15 to 4 mm. On the other hand, in the case of the negative electrode having the structure in which the negative electrode material mixture layer is provided on a surface of the current collector, the negative electrode material mixture layer preferably has a thickness (the thickness per surface of the current collector when the negative electrode material mixture layer is provided on the both surfaces of the current collector) of 10 to 100 μm.

<Solid Electrolyte Layer>

A solid electrolyte constituting the solid electrolyte layer of the flat-shaped all-solid battery according to this embodiment can be, e.g., a hydride-based solid electrolyte, a sulfide-based solid electrolyte, or an oxide-based solid electrolyte. These can be used alone or in a combination of two or more.

Specific examples of the hydride-based solid electrolyte include $LiBH_4$ and a solid solution of $LiBH_4$ and the following alkali metal compound (e.g., that having a molar ratio of $LiBH_4$ to the alkali metal compound of 1:1 to 20:1). The alkali metal compound of the solid solution can be at least one selected from the group consisting of halogenated lithium (e.g., UL LiBr, LiF, or LiC), halogenated rubidium (e.g., RbI, RbBr, RbF, or RbCl), halogenated cesium (e.g., CsI, CsBr, CsF, or CsCl), lithium amide, rubidium amide, and cesium amide.

Specific examples of the sulfide-based solid electrolyte can include $Li_2S—P_2S_3$, $Li_2S—P_2S_5$, $Li_2S—P_2S_3—P_2S_5$, $Li_3S—SiS_2$, $LiI—Li_2S—P_2S_3$, $LiI—Li_2S—SiS_2—P_2S_5$, $Li_2S—SiS_2—Li_4SiO_4$, $Li_2S—SiS_2—Li_3PO_4$, $Li_3PS_4—Li_4GeS_4$, $Li_{3.4}P_{0.6}Si_{0.4}S_4$, $Li_{3.25}P_{0.25}Ge_{0.76}S_4$, $Li_{4-x}Ge_{1-x}P_xS_4$, and $Li_7P_3S_{11}$. However, an argyrodite type solid electrolyte expressed by a general formula such as $Li_6PS_5X$ (X: Cl, Br, or I) is preferably used.

Specific examples of the oxide-based solid electrolyte can include $Li_7La_3Zr_2O_{12}$, $LiTi(PO_4)_3$, $LiGe(PO_4)_3$, and $LiLaTiO_3$.

The solid electrolyte layer can be formed by, e.g., molding powder of the solid electrolyte under pressure while heating the powder; or dispersing the solid electrolyte into a solvent to prepare a composition for forming the solid electrolyte layer, applying the composition to a base material, and peeling the composition off from the base material after drying the composition.

Moreover, for the solid electrolyte layer, a core member such as a mesh made of a resin can be used as appropriate.

The solid electrolyte layer preferably has a thickness of 100 to 200 μm.

<Other Constituent Members>

The outer can and the sealing can that constitute the battery container of the flat-shaped all-solid battery according to this embodiment can be made of stainless steel. Moreover, a material for the gasket can be made of, e.g., polypropylene or nylon. Further, when heat resistance is required in relation to the intended use of the battery, the gasket can also be made of a heat-resistant resin with a melting point of more than 240° C., including, e.g., a fluorocarbon resin such as a tetrafluoroethylene-perfluoroalkoxyethylene copolymer (PFA); polyphenylene ether (PPE); polysulfone (PSF); polyarylate (PAR); polyether sulfone (PS); polyphenylene sulfide (PPS); and polyether ether ketone (PEEK). Further, when the intended use of the battery requires heat resistance, the outer container can be sealed by a glass hermetic seal.

<Assembling Process>

The flat-shaped all-solid battery according to this embodiment can be assembled, e.g., by the following process.

Either a dry method or a wet method can be used to produce the electrodes and the solid electrolyte layer. However, in order to prevent moisture contained in a solvent (a dispersion medium) used for forming a slurry used in the wet method from reacting with the solid electrolyte, the production by the dry method is desirable.

The positive electrode can be produced by sufficiently mixing the positive electrode active material with other components that constitute the positive electrode material mixture such as the solid electrolyte and the conductivity enhancing agent in a container, and molding the obtained mixture under pressure to obtain a molded body of the positive electrode material mixture.

In the same manner as the positive electrode, the negative electrode can be produced by sufficiently mixing the negative electrode active material with other components that constitute the negative electrode material mixture such as the solid electrolyte and the conductivity enhancing agent in a container, and molding the obtained mixture under pressure to obtain a molded body of the negative electrode material mixture.

The solid electrolyte layer can be produced by molding powder of the solid electrolyte under pressure while heating the powder as needed to obtain a molded body of the solid electrolyte.

The electrode stack can be produced by sequentially stacking the positive electrode (the molded body of the positive electrode material mixture), the solid electrolyte layer (the molded body of the solid electrolyte), the negative electrode (the molded body of the negative electrode material mixture), and then applying pressure and uniting the stack. Alternatively, the electrode stack can be produced by stacking the positive electrode and the negative electrode on each side of the solid electrolyte layer.

Moreover, in order to simplify the production, a molded body (the electrode stack) can be produced by producing a molded body of the positive electrode material mixture (or a molded body of the negative electrode material mixture), then placing powder of the solid electrolyte on the above molded body, molding the powder under pressure to produce a molded body in which one electrode and the solid electrolyte layer are united, placing a material mixture of the other electrode on the solid electrolyte layer, and molding the material mixture under pressure to produce a molded body in which the positive electrode, the solid electrolyte layer, and the negative electrode are united. Also, in this case, the electrode stack can be produced by producing a molded body of the solid electrolyte, and then producing, on one side of the above molded body, a molded body of the positive electrode material mixture and, on the other side of the above molded body, a molded body of the negative electrode material mixture.

Figure 4:
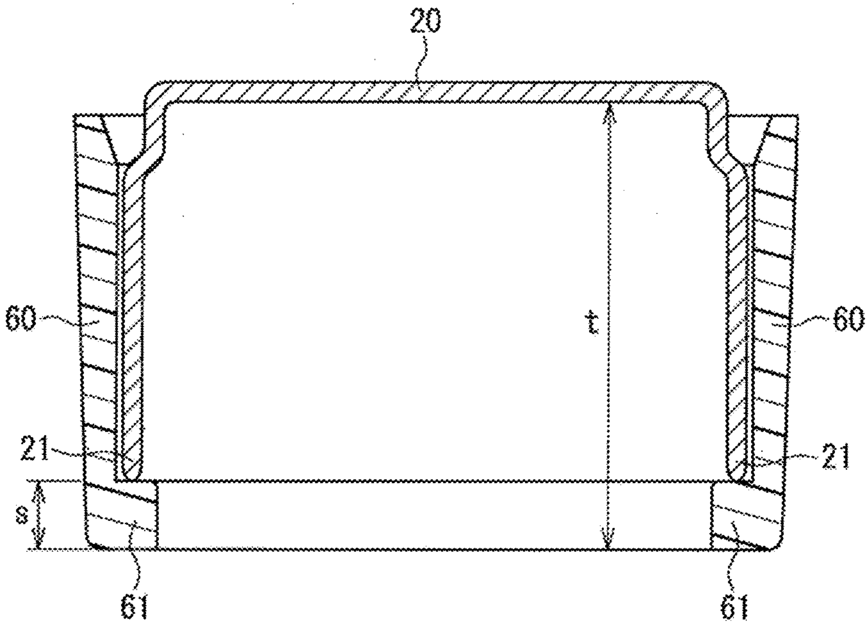
FIG. 4 is a schematic cross-sectional view illustrating an example of a sealing can on which a gasket is installed.
Figure 5:
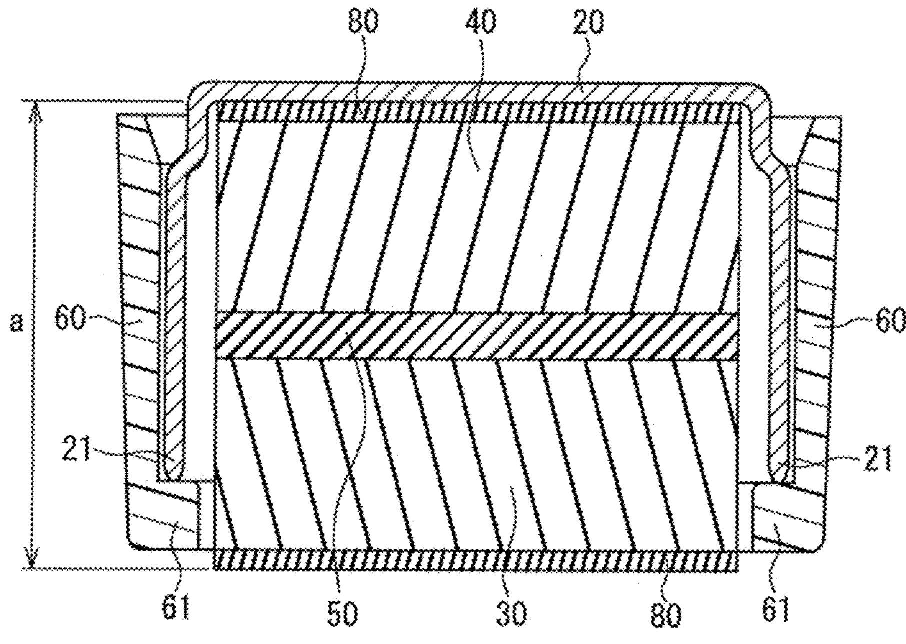
FIG. 5 is a schematic cross-sectional view illustrating an example of an assembly in which a conductive porous member proximate to the sealing can, an electrode stack, and a conductive porous member proximate to an outer can are stacked in this order, on an inner bottom surface of the sealing can.

The produced electrode stack is inserted inside of the sealing can 20 on which the annular gasket 60 is installed as illustrated in FIG. 4. As illustrated in FIG. 5, an assembly is constituted in which the conductive porous member 80 proximate to the sealing can, the electrode stack (the negative electrode 40, the solid electrolyte layer 50, and the positive electrode 30), and the conductive porous member 80 proximate to the outer can are stacked in this order, on the inner bottom surface of the sealing can 20. In FIG. 5, the assembly is inverted.

The gasket 60 can be molded in advance and fitted on the sealing can 20, or formed directly on a surface of the sealing can 20 by a method such as insert molding.

The assembly is covered with the outer can 10. The opening edge 11 is crimped. Thus, the bottom surface portion 61 of the gasket 60 is compressed with the opening edge 21 of the sealing can 20, and the conductive members 80, 80 are compressed with the inner bottom surfaces of the sealing can 20 and the outer can 10.

Thus, the flat-shaped all-solid battery illustrated in FIG. 3 can be obtained.

Here, in order to sufficiently exhibit sealing effects of the gasket 60 and the effects of the conductive porous members 80, 80 described above by moderately compressing the bottom surface portion 61 of the gasket 60 and moderately compressing the conductive porous members 80, 80 when the opening edge 11 of the outer can 10 is crimped, it is desirable that the assembly is constituted so as to satisfy the following conditions.

Provided that t (mm, FIG. 4) represents the height from the inner bottom surface of the sealing can 20 to an end of the bottom surface portion 61 (*a* portion sandwiched between the opening edge 21 of the sealing can 20 and the inner bottom surface of the outer can 10) of the gasket 60 that is proximate to the outer can, and a (mm, FIG. 5) represents the total of the thicknesses of the electrode stack and the conductive porous members 80, 80 in the assembly, it is desirable that there is not a large difference between the values of the t and the a for the facilitation of the sealing by crimping. Specifically, a−t preferably satisfies $-0.25 \leq a-t \leq 0.18$ (mm), more preferably −0.2 (mm) or more, even more preferably −0.15 (mm) or more, and further preferably −0.1 (mm) or more.

Meanwhile, a−t more preferably satisfies 0.15 (mm) or less, even more preferably 0.12 (mm) or less, and further preferably 0.1 (mm) or less.

As the value of a−t increases, the degree of compression of the conductive porous members increases, and stress relieve effects could deteriorate in the crimping. Therefore, it is desirable to set the thickness of each of the constituent members such as the conductive porous members in accordance with the value of a−t.

In the case of $a-t \geq 0$, the following is considered. When the opening edge 11 of the outer can 10 is crimped, the conductive porous members 80, 80 are firstly compressed, the total a of the thicknesses of the electrode stack and the conductive porous members 80, 80 (in this case, the a is nearly equal to the distance between the inner bottom surface f the outer can 10 and the inner bottom surface of the sealing can 20) decreases and becomes nearly equal to the t, and then, the bottom surface portion 61 of the gasket 60 is compressed. Therefore, provided that b (mm) represents the total of the thicknesses of the conductive porous members 80, 80, and if the bis not greater than a−t to a certain extent, the conductive porous members 80, 80 are too compressed, so that the conductive porous members 80, 80 could be unable to receive a stress in the crimping.

Therefore, $b \geq 3.5 \times (a-t)$ is preferred, $b \geq 4 \times (a-t)$ is more preferred, and $b \geq 5 \times (a-t)$ is further preferred.

Meanwhile, if the thicknesses of the conductive porous members 80, 80 are too great, the thickness of the electrode stack needs to be relatively adjusted to reduce the capacities of the electrodes, and therefore, $b \leq 10 \times (a-t)$ is preferred.

Moreover, in the case of $a-t<0$, the following is considered. When the opening edge 11 of the outer can 10 is crimped, the bottom surface portion 61 of the gasket 60 is firstly compressed, the height t from the inner bottom surface of the sealing can 20 to the end of the bottom surface portion 61 of the gasket 60 proximate to the outer can (in this case, the t is nearly equal to the distance between the inner bottom surface of the outer can 10 and the inner bottom surface of the sealing can 20) decreases and becomes nearly equal to the a, and then, the conductive porous members 80, 80 are compressed. Therefore, provided that s (mm, FIG. 4) represents the thickness of the bottom surface portion 61 of the gasket 60 in the height direction, and if the s is not greater than t−a to a certain extent, the gasket 60 is too compressed, so that a crack could occur on the bottom surface portion 61 of the gasket 60 in the crimping, and sealing properties could deteriorate, or the opening edge 21 of the sealing can 20 could cause a short circuit with the inner bottom surface of the outer can 10.

Therefore, $s \geq 22 \times (t-a)$ is preferred, $s \geq 3 \times (t-a)$ is more preferred, and $s \geq 5 \times (t-a)$ is further preferred.

Meanwhile, if the thickness s of the bottom surface portion 61 of the gasket 60 is too great, the compressing in the crimping is insufficient to deteriorate the sealing properties, and therefore, $s \leq 15 \times (t-a)$ is preferred.

Specifically, the thickness s of the bottom surface portion 61 of the gasket 60 is preferably 0.1 mm or more, and more preferably 0.2 mm or more, and meanwhile is preferably 1 mm or less, and more preferably 0.8 mm or less.

The flat-shaped all-solid battery according to this embodiment can be applied to the intended use similar to that of conventionally known secondary batteries. However, the flat-shaped all-solid battery that includes the solid electrolyte instead of an organic electrolyte is excellent in heat resistance, and thus can be used favorably for intended use in exposure to a high temperature.

Moreover, in the flat-shaped all-solid battery according to this embodiment, the gasket is interposed between the outer can and the sealing can, and the opening edge of the outer can is crimped to seal the outer can. However, the flat-shaped all-solid battery described in this application is not limited to this, and can be a battery in which the outer can adheres to the sealing can to seal the outer can without using the gasket as an example of the flat-shaped all-solid battery.

EXAMPLES

Hereinafter, the flat-shaped all-solid battery described in this application is described in further detail based on the examples. However, the flat-shaped all-solid battery described in this application is not limited to the following examples.

Example 1

<Production of Positive Electrode>

$LiNi_{0.33}Co_{0.33}Mn_{0.33}O_2$ having an average particle size of 3 μm as a positive electrode active material, a sulfide solid electrolyte ($Li_6PS_5Cl$) having an argyrodite type structure, and carbon nanotube ["VGCF" (trade name) manufactured by Showa Denko K.K.] as a conductivity enhancing agent were mixed with each other at a mass ratio of 65:30:5, and were sufficiently kneaded to prepare a positive electrode material mixture. Next, 75 mg of the positive electrode material mixture was placed in a powder compaction mold, and was molded under pressure using a press to prepare a positive electrode constituted by a positive electrode material mixture molded body having a thickness of 0.85 mm.

<Formation of Solid Electrolyte Layer>

Next, 24 mg of the sulfide solid electrolyte was placed on the positive electrode material mixture molded body in the powder compaction mold, and was molded under pressure using the press to form a solid electrolyte layer having a thickness of 0.4 mm on the positive electrode material mixture molded body.

<Production of Negative Electrode>

$Li_4Ti_5O_{12}$ having an average particle size of 35 μm as a negative electrode active material, the sulfide solid electrolyte, and the carbon nanotube were mixed with each other at a mass ratio of 55:40:5, and were sufficiently kneaded to prepare a negative electrode material mixture. Next, 122 mg of the negative electrode material mixture was placed on the solid electrolyte layer in the powder compaction mold, and was molded under pressure using the press to form a negative electrode constituted by a negative electrode material mixture molded body having a thickness of 2.05 mm on the solid electrolyte layer to produce an electrode stack including the positive electrode, the solid electrolyte layer, and the negative electrode that were stacked and having a diameter of 6.4 mm and a thickness of 3.3 mm.

<Assembling of Battery>

Two sheets having the same size as the electrode stack were prepared by punching a flexible graphite sheet "PERMA-FOIL (trade name)" (thickness: 0.1 mm, apparent density: 1.1 g/cm$^3$) manufactured by Toyo Tanso Co., Ltd., in the form of a sheet obtained by molding expandable graphite without using a binder. One of the graphite sheets was disposed on an inner bottom surface of a sealing can made of stainless steel on which an annular gasket made of polypropylene was fitted. Next, the electrode stack was laid on the graphite sheet such that the negative electrode was proximate to the graphite sheet, and the other graphite sheet was disposed thereon to constitute an assembly illustrated in FIG. 5.

At this time, the b: the total of the thicknesses of the two graphite sheets; the a: the total of the thicknesses of the electrode stack and the graphite sheets; the s: the thickness of a bottom surface portion of the gasket in the height direction; and the t: the height from the inner bottom surface of the sealing can to an end of the bottom surface portion of the gasket that was proximate to an outer can were as follows: b=0.2 (mm), a=3.5 (mm), s=0.5 (mm), and t=3.65 (mm).

The assembly was covered with the outer can made of stainless steel, and then an opening edge of the outer can was crimped inwardly to seal the outer can in order to produce a flat-shaped all-solid battery having a diameter of about 7 mm in which the individual graphite sheets were disposed between the stack and the inner bottom surface of the sealing can, and between the stack and an inner bottom surface of the outer can.

The distance between the inner bottom surface of the outer can and the inner bottom surface of the sealing can after sealing was 3.47 mm. Moreover, the compression ratio of the bottom surface portion of the gasket was calculated at 36%, and the compression ratio of the graphite sheets was calculated at 15%.

Example 2

An assembly was constituted in the same manner as in Example 1 except that three sheets were prepared by punching the flexible graphite sheet, two of the sheets were disposed between the inner bottom surface of the sealing can and the negative electrode of the electrode stack, and the remaining one sheet was disposed on the positive electrode of the electrode stack.

In the assembly, the b, the a, the s, and the t were as follows: b=0.3 (mm), a=3.6 (mm), s=0.5 (mm), and t=3.65 (mm).

Then, a flat-shaped all-solid battery was produced in the same manner as in Example 1. The distance between the inner bottom surface of the outer can and the inner bottom surface of the sealing can after sealing was 3.51 mm. Moreover, the compression ratio of the bottom surface portion of the gasket was calculated at 28%, and the compression ratio of the graphite sheets was calculated at 30%.

Example 3

An assembly was constituted in the same manner as in Example 1 except that the thickness of the flexible graphite sheet was changed from 0.1 mm to 0.2 mm. Then, a flat-shaped all-solid battery was produced in the same manner as in Example 1.

In the assembly, the b, the a, the s, and the t were as follows: b=0.4 (mm), a=3.7 (mm), s=0.5 (mm), and t=3.65 (mm). In the produced battery, the distance between the inner bottom surface of the outer can and the inner bottom surface of the sealing can after sealing was 3.52 mm. Moreover, the compression ratio of the bottom surface portion of the gasket was calculated at 26%, and the compression ratio of the graphite sheets was calculated at 45%.

Example 4

An electrode stack having a thickness of 3.25 mm was produced in the same manner as in Example 1 except that the thickness of the solid electrolyte layer was changed from 0.4 mm to 0.35 mm. Moreover, a flat-shaped all-solid battery was produced in the same manner as in Example 1 except that the thickness of the flexible graphite sheet was changed from 0.1 mm to 0.07 mm, and the assembly was constituted using the above electrode stack.

In the assembly, the b, the a, the s, and the t were as follows: b=0.14 (mm), a=3.39 (mm), s=0.5 (mm), and t=3.65 (mm). In the produced battery, the distance between the inner bottom surface of the outer can and the inner bottom surface of the sealing can after sealing was 3.37 mm. Moreover, the compression ratio of the bottom surface portion of the gasket was calculated at 56%, and the compression ratio of the graphite sheets was calculated at 14%.

Example 5

An assembly was constituted in the same manner as in Example 4 except that the thickness of the flexible graphite sheet was changed from 0.07 mm to 0.3 mm, and then a flat-shaped all-solid battery was produced in the same manner as in Example 4.

In the assembly, the b, the a, the s, and the t were as follows: b=0.6 (mm), a=3.85 (mm), s=0.5 (mm), and t=3.65 (mm). In the produced battery, the distance between the inner bottom surface of the outer can and the inner bottom surface of the sealing can after sealing was 3.54 mm. Moreover, the compression ratio of the bottom surface portion of the gasket was calculated at 22%, and the compression ratio of the graphite sheets was calculated at 52%.

Example 6

An assembly was constituted in the same manner as in Example 1 except that the thickness of the flexible graphite sheet was changed from 0.1 mm to 0.2 mm, and the graphite sheet was disposed only between the inner bottom surface of the sealing can and the electrode stack, and then, a flat-shaped all-solid battery was produced in the same manner as in Example 1.

In the assembly, the b, the a, the s, and the t were as follows: b=0.2 (mm), a=3.5 (mm), s=0.5 (mm), and t=3.65 (mm). In the produced battery, the distance between the inner bottom surface of the outer can and the inner bottom surface of the sealing can after sealing was 3.47 mm. Moreover, the compression ratio of the bottom surface portion of the gasket was calculated at 36%, and the compression ratio of the graphite sheet was calculated at 15%.

Example 7

An assembly was constituted in the same manner as in Example 1 except that a conductive sheet having a thickness of 0.2 mm and made of a nonwoven fabric of carbon fibers was used instead of the flexible graphite sheet, and then, a flat-shaped all-solid battery was produced in the same manner as in Example 1.

In the assembly, the b, the a, the s, and the t were as follows: b=0.4 (mm), a=3.7 (mm), s=0.5 (mm), and t=3.65 (mm). In the produced battery, the distance between the inner bottom surface of the outer can and the inner bottom surface of the sealing can after sealing was 3.48 mm. Moreover, the compression ratio of the bottom surface portion of the gasket was calculated at 34%, and the compression ratio of the carbon nonwoven fabrics was calculated at 55%.

Comparative Example 1

An electrode stack having a thickness of 3.5 mm was produced in the same manner as in Example 1 except that the thickness of the solid electrolyte layer was changed from 0.4 mm to 0.6 mm. Moreover, a flat-shaped all-solid battery was produced in the same manner as in Example 1 except that the flexible graphite sheet was not used, the negative electrode of the electrode stack was in direct contact with the inner bottom surface of the sealing can, and the positive electrode of the electrode stack was in direct contact with the inner bottom surface of the outer can.

In the produced battery, the distance between the inner bottom surface of the outer can and the inner bottom surface of the sealing can after sealing was 3.49 mm. Moreover, the compression ratio of the bottom surface portion of the gasket was calculated at 32%.

Comparative Example 2

An assembly was constituted in the same manner as in Example 1 except that, instead of the flexible graphite sheet, a foamed base material (porosity: 97%) having a thickness of 1 mm and made of copper was disposed between the inner bottom surface of the sealing can and the negative electrode of the electrode stack, and a foamed base material (porosity:

97%) having a thickness of 1 mm and made of aluminum was disposed on the positive electrode of the electrode stack.

In the assembly, the b, the a, the s, and the t were as follows: b=2 (mm), a=5.3 (mm), s=0.5 (mm), t=3.65 (mm).

Then, a flat-shaped all-solid battery was produced in the same manner as in Example 1. The distance between the inner bottom surface of the outer can and the inner bottom surface of the sealing can after sealing was 3.51 mm. Moreover, the compression ratio of the bottom surface portion of the gasket was calculated at 28%, and the compression ratio of the foamed base materials was calculated at 90%.

Table 1 indicates dimension relationships of the assembly in Examples 1-7 and Comparative Examples 1-2.

TABLE 1

| | a | b | s | t | a − t | b/ (a − t) | s/ (t − a) |
|---|---|---|---|---|---|---|---|
| Example 1 | 3.5 | 0.2 | 0.5 | 3.65 | −0.15 | — | 3.3 |
| Example 2 | 3.6 | 0.3 | 0.5 | 3.65 | −0.05 | — | 10 |
| Example 3 | 3.7 | 0.4 | 0.5 | 3.65 | 0.05 | 8 | — |
| Example 4 | 3.39 | 0.14 | 0.5 | 3.65 | −0.26 | — | 1.92 |
| Example 5 | 3.85 | 0.6 | 0.5 | 3.65 | 0.2 | 3 | — |
| Example 6 | 3.5 | 0.2 | 0.5 | 3.65 | −0.15 | — | 3.3 |
| Example 7 | 3.7 | 0.4 | 0.5 | 3.65 | 0.05 | 8 | — |
| Comparative Example 1 | 3.5 | 0 | 0.5 | 3.65 | −0.15 | — | 3.3 |
| Comparative Example 2 | 5.3 | 2 | 0.5 | 3.65 | 1.65 | 1.21 | — |

<Confirmation of Crack on Electrode Stack>

Ten batteries of each of Examples 1-7 and Comparative Examples 1-2 were produced, and each produced flat-shaped all-solid battery was observed using an X-ray CT scanner to confirm whether a crack had occurred on the electrode stack.

In the flat-shaped all-solid batteries of each of Examples 1-4, no crack was observed on the electrode stack in all of the produced batteries by disposing the conductive porous sheet constituted by a molded body of graphite and having flexibility between the electrode stack and the inner bottom surface of the sealing can, and between the electrode stack and the inner bottom surface of the outer can.

Moreover, in the flat-shaped all-solid batteries of Example 7, no crack was observed on the electrode stack in all of the produced batteries by using the nonwoven fabric of carbon fibers as a conductive porous member.

Meanwhile, in the flat-shaped all-solid batteries of Example 5, the conductive porous sheet was disposed between the electrode stack and the inner bottom surface of the sealing can, and between the electrode stack and the inner bottom surface of the outer can in the same manner as the batteries of Examples 1-4. However, in four batteries, a crack was observed on the negative electrode or the positive electrode. The reason for this is considered as follows: because the value of a−t was more than 0.18 (mm), the degree of compression of the flexible graphite sheet increased, which deteriorated effects of relieving a stress in the crimping.

Moreover, in the flat-shaped all-solid batteries of Example 6, the conductive porous sheet was disposed only between the inner bottom surface of the sealing can and the electrode stack. A crack was observed on the positive electrode in one battery.

When the conductive porous sheet is disposed on only one side of the electrode stack, a crack on an electrode can be prevented to a certain extent. However, as is clear from the comparison of Examples 1 and 6, it is possible to more reliably prevent a crack on the electrodes by disposing the conductive porous sheet on both sides of the electrode stack.

Moreover, also in the flat-shaped all-solid batteries of Comparative Example 2 in which the metallic foamed base materials were used as a conductive porous member instead of the flexible graphite sheet, the foamed base materials were compressed, and relieved a stress. Thus, no crack was observed on the electrode stack in all of the produced batteries.

On the other hand, in the flat-shaped all-solid batteries of Comparative Example 1 in which the electrode stack was in direct contact with the inner bottom surface of the sealing can and the inner bottom surface of the outer can, a crack was observed on an edge portion of the negative electrode facing the sealing can or an edge portion of the positive electrode facing the outer can as illustrated in FIGS. 1 and 2 in all of the produced batteries.

<Evaluation of Battery Characteristics>

Five batteries in which no crack was observed on the electrodes were selected among the batteries of Examples 1-7 and Comparative Example 2 in which each of the electrode stacks was checked for a crack. The five batteries were subjected to a charging-discharging cycle for 100 times in a temperature environment at 100° C. under the following conditions. An average of the ratios (a capacity retention rate) of the discharge capacity in the 100th cycle to the discharge capacity in the second cycle was calculated to evaluate cycle characteristics.

The charging was constant-current and constant-voltage charging that was a combination of constant-current charging performed until a battery voltage reached 3.1V with a current value of 0.2 C and constant-voltage charging performed until a current value reached 0.02 C with a voltage of 3.1 V. The discharging was constant-current discharging performed until a battery voltage reached 1.2V with a current value of 0.2 C.

Table 2 indicates the above evaluation results together with confirmation results of a crack on an electrode stack.

TABLE 2

| | Battery in which crack appeared on electrode (number) | Capacity retention rate (%) |
|---|---|---|
| Example 1 | 0 | 94 |
| Example 2 | 0 | 96 |
| Example 3 | 0 | 98 |
| Example 4 | 0 | 83 |
| Example 5 | 4 | 77 |
| Example 6 | 1 | 84 |
| Example 7 | 0 | 87 |
| Comparative Example 1 | 10 | — |
| Comparative Example 2 | 0 | 10 |

In the batteries of Examples 1-3 and 6-7 in which the assembly was constructed to satisfy $-0.25 \leq a-t \leq 0.18$ (mm), it was found that the sealing by crimping sufficiently functioned, and the batteries had a high capacity retention rate.

In the batteries of Example 4, since $a-t<-0.25$ was satisfied, and the compression ratio of the gasket was too high, it is considered that in the batteries of Example 4, the sealing properties deteriorated and the capacity retention rate deteriorated as compared with the batteries of Examples 1-3.

In the batteries of Example 5, since $a-t>0.18$ was satisfied, and the compression ratio of the conductive porous sheets was too high, it is considered that in the batteries of Example 5, functions corresponding to the expansion and the contraction of the electrode stack deteriorated and the capacity retention rate deteriorated as compared with the batteries of Examples 1-3.

In the batteries of Example 6, since the conductive porous sheet was not disposed between the inner bottom surface of the outer can and the electrode stack, it is considered that the contact resistance proximate to the positive electrode increased as compared with the batteries of Examples 1-3, the uniformity of charge and discharge reaction deteriorated, and the capacity retention rate deteriorated as compared with the batteries of Examples 1-3.

In the batteries of Example 7, since the nonwoven fabric of carbon fibers was used as a conductive porous sheet, it is considered that the restorability of the conductive porous sheet deteriorated as compared with the batteries of Examples 1-3, and therefore, the contact resistance increased, the uniformity of charge and discharge reaction deteriorated, and the capacity retention rate deteriorated as compared with the batteries of Examples 1-3.

However, the batteries of all of the examples had a high capacity retention rate as compared with the batteries of Comparative Example 2 in which the metallic foamed base materials that had little restorability after compressed were used as a conductive porous member. This can confirm effects of using as a conductive porous member a conductive porous sheet constituted by fibers of a carbon material or a conductive parous sheet constituted by a molded body of graphite and having flexibility.

The present invention can be embodied in other forms without departing from the spirit or essential characteristics thereof. The embodiment disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

DESCRIPTION OF REFERENCE NUMERALS

1, 100 Flat-shaped all-solid battery
10 Outer can
11 Opening edge
20 sealing can
21 Opening edge
30 Positive electrode
40 Negative electrode
50 Solid electrolyte layer
60 Gasket
61 Bottom surface portion
70 Crack
80 Conductive porous member

The invention claimed is:

1. A flat-shaped all-solid battery, comprising:
a battery container constituted by an outer can and a sealing can; and
a stack which a positive electrode, a solid electrolyte layer, and a negative electrode are stacked to form,
wherein the stack is housed in the battery container, and
a conductive porous member consisting of a molded body of expandable graphite without using a binder and having flexibility, compressibility, and restorability is disposed between the stack and an inner bottom surface of the outer can and/or between the stack and an inner bottom surface of the sealing can,
wherein the flat-shaped all-solid battery does not include any organic solvent as an electrolyte.

2. The flat-shaped all-solid battery according to claim 1, wherein the conductive porous member is disposed respectively between the stack and the inner bottom surface of the sealing can, and between the stack and the inner bottom surface of the outer can.

3. The flat-shaped all-solid battery according to claim 2, wherein an electrode proximate to the sealing can is constituted by a molded body of an electrode material mixture containing an active material.

4. The flat-shaped all-solid battery according to claim 3, wherein the molded body of the electrode material mixture contains no binder.

5. The flat-shaped all-solid battery according to claim 1, wherein the conductive porous member has a thickness of 0.03 to 0.5 mm.

6. The flat-shaped all-solid battery according to claim 1, wherein the conductive porous member has an apparent density of 0.5 to 1.7 $g/cm^3$.

7. The flat-shaped all-solid battery according to claim 1, wherein the stack contains a sulfide-based solid electrolyte.

8. A method for manufacturing a flat-shaped all-solid battery comprising a battery container constituted by an outer can and a sealing can and a stack which a positive electrode, a solid electrolyte layer, and a negative electrode are stacked to form,
the method comprising:
inserting the stack inside of the sealing can on which an annular gasket is installed;
constituting an assembly by stacking a conductive porous member and the stack, wherein the assembly has the conductive porous member on at least one side of the stack; and
sealing the outer can by covering the assembly with the outer can and crimping the outer can,
wherein the conductive porous member is disposed between the stack and an inner bottom surface of the outer can and/or between the stack and an inner bottom surface of the sealing can,
wherein the conductive porous member is a conductive porous sheet constituted by a molded body of expandable graphite and having flexibility,
wherein the gasket comprises a bottom surface portion sandwiched between an opening edge of the sealing can and the inner bottom surface of the outer can, and
wherein before the assembly is covered with the outer can, the assembly is constituted to satisfy $-0.25 \leq a-t \leq 0.18$, where t (mm) represents a height from the inner bottom surface of the sealing can to an end of the bottom surface portion of the gasket, the end being proximate to the outer can, and a (mm) represents a total of thicknesses of the stack and the conductive porous member.

9. The method according to claim 8, wherein the conductive porous member is disposed respectively between the stack and the inner bottom surface of the sealing can, and between the stack and the inner bottom surface of the outer can.

10. The method according to claim 8, wherein the conductive porous member is the conductive porous sheet constituted by the molded body of the expandable graphite and having flexibility.

* * * * *